United States Patent [19]

Heisler

[11] Patent Number: 5,070,990
[45] Date of Patent: Dec. 10, 1991

[54] AUTOMATIC TILTING CARRIAGE FOR NESTED PREFORMED CONTAINERS

[76] Inventor: Raymond A. Heisler, 657 Dakota Trail, Franklin Lakes, N.J. 07417

[21] Appl. No.: 670,038

[22] Filed: Mar. 15, 1991

[51] Int. Cl.⁵ .......................................... B65G 25/00
[52] U.S. Cl. ..................... 198/409; 198/412; 198/468.11; 414/795.8
[58] Field of Search ............... 198/409, 412, 468.11, 198/406; 414/798.9, 796.4, 795.8

[56] References Cited

U.S. PATENT DOCUMENTS

| | | | |
|---|---|---|---|
| 3,160,260 | 12/1964 | Holland, Jr. | 414/795.4 |
| 3,993,200 | 11/1976 | Ide | 198/412 X |
| 4,037,734 | 7/1977 | Erdman | 414/795.8 X |
| 4,618,054 | 10/1986 | Muller | 198/409 |
| 4,983,098 | 1/1991 | Heisler | 198/604 X |

Primary Examiner—D. Glenn Dayoan
Assistant Examiner—Cheryl L. Gastineau
Attorney, Agent, or Firm—Patrick J. Pinto

[57] ABSTRACT

An automatically operated feeding and reorienting apparatus for vertically oriented stacks of nested preformed containers including a continuously advancing infeed conveyor 10 for advancing individual vetical stacks of nested containers to a transfer means assembly 12, whereat a single stack of containers 84A is separated and transferred to a tilting carriage assembly 14, whereupon the nested stack is reoriented by tilting to a substantially horizontal disposition, upon completion of said reorientation the now horizontally oriented stack of containers is advanced onto a denesting conveyor assembly 16 by a stack advancing assembly 66.

13 Claims, 3 Drawing Sheets

AUTOMATIC TILTING CARRIAGE FOR NESTED PREFORMED CONTAINERS

BACKGROUND OF THE INVENTION

1. Field of the Invention

This invention is believed to be found in the field of Article Handling and more particularly in the field of an automatic reorienting device for nested preformed containers.

2. Description of the Prior Art

The reorienting of articles is known. Some examples of prior art are U.S. Pat. No. 3,160,260 as issued to Holland on Dec. 8, 1964; and my U.S. Pat. No. 4,983,098, issued 01/08/91. U.S. Pat. No. 4,983,098 is soley owned by the present inventor and is incorporated by reference into this application to the extent the present law allows. Holland shows a reorienting apparatus for stacked cartons but neither shows a means for advancing the vertical stack to the reorienting carriage or a linear actuator for advancing the stack of articles horizontally after reorientation. It has been determined that there is a need to deliver a vertical stack of nested preformed containers at substantially floor level; automatically transferring said stack to a tilting or reorienting carriage; and subsequently tilting and advancing said nested stack onto an elevated horizontal endless belt conveyor. This needed apparatus should also be capable of accommodating various types of containers within a range of sizes.

SUMMARY OF THE INVENTION

This invention may be summarized, at least in part, with respect to its objects. It is an object of this invention to provide and it does provide a means for accumulating a plurality of vertically oriented stacks of nested preformed containers in a single row or line.

It is another object of this invention to provide and it does provide an apparatus for automatically transferring a first vertical stack of said accumulated stacks onto a tilting carriage.

It is still another object of this invention to provide and it does provide a tilting carriage which is automatically responsive to the needs of a denesting apparatus by tilting and advancing a nested stack, thereon, onto said denesting apparatus.

In addition to the above summary, the following disclosure is detailed to ensure adequacy and aid in the understanding of this present invention. This disclosure, however, is not intended to cover each new and inventive concept, no matter how it may later be disguised by variations in form, additions, or by further improvements. For this reason, there has been chosen specific embodiments of an apparatus for automatically feeding, reorienting, and advancing a nested stack of preformed containers. This apparatus is particularly adapted for use with commercially available material handling equipment or manual loading. These specific embodiments have been chosen for the purpose of illustration and description, as shown in the accompanying drawings wherein:

BRIEF DESCRIPTION OF THE DRAWING

In the following description and in the claims, various details are identified by specific names for convenience. These names are intended to be generic in their application. The corresponding reference characters refer to like members throughout the several figures of the drawings.

The drawings accompanying, and forming a part of this specification disclose certain details of construction associated with automatically reorienting a vertical stack of nested preformed containers, and feeding said reoriented stack onto a denesting apparatus. These details are for the purpose of explanation, but structural details may be modified without departure from the concept and principles of the present invention. It is anticipated that this invention may be incorporated into forms other than as shown.

DESCRIPTION OF THE PREFERRED EMBODIMENT

Figure 1:
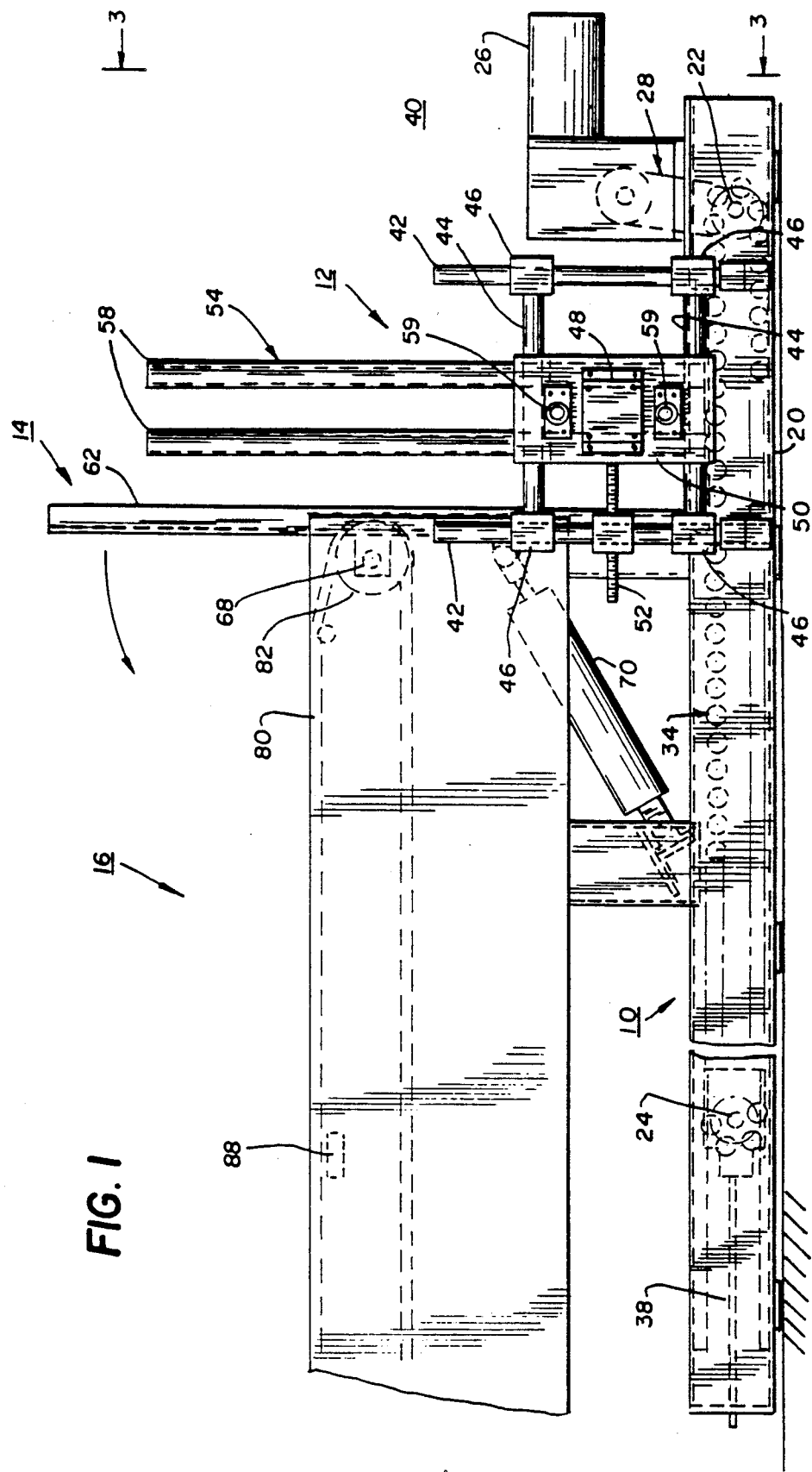
FIG. 1 represents a front elevation view of the apparatus of the present invention, this view particularly showing an infeed conveyor, a tilting carriage, and a frame from a denesting apparatus.

Referring to FIG. 1, the apparatus of the present invention is shown comprising an infeed conveyor, generally identified as 10; a transfer assembly generally identified as 12; a tilting carriage assembly, generally identified as 14; and a horizontal conveying assembly or denesting assembly, generally identified as 16.

Figure 2:
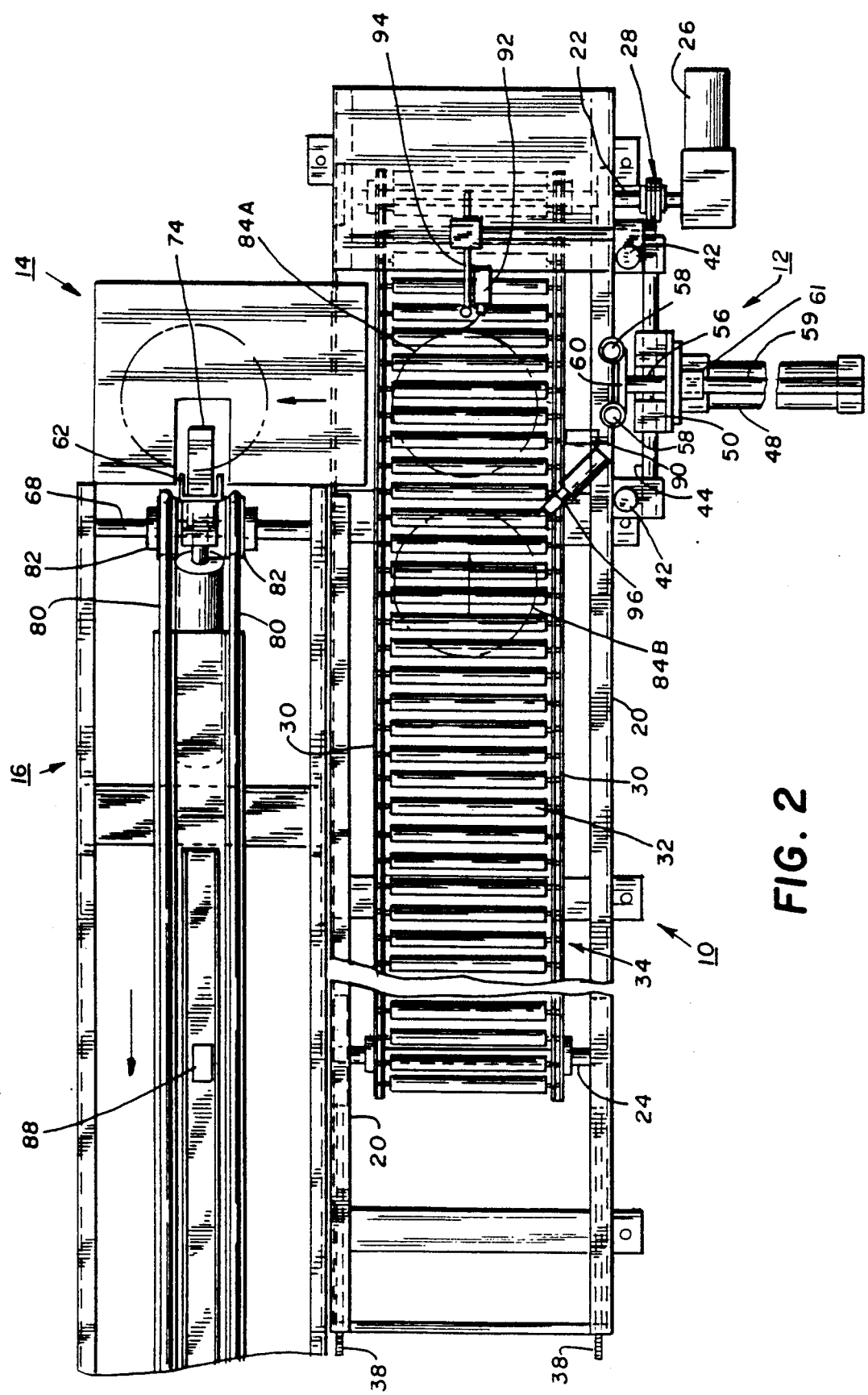
FIG. 2 represents a plan view of the apparatus of FIG. 1 and in the same scale.

Referring now to FIG. 2, the infeed conveyor 10 comprises a welded frame 20 having a drive shaft 22 and take-up shaft 24 journaled therein. The drive shaft 22 is driven by drive means 26 by way of a conventional power transmission means 28 such as a chain and sprocket arrangement, as may be seen in FIG. 1. Referring again to FIG. 2, a pair of spaced continuous chains 30 carry a plurality of rollers 32. Rollers 32 are freely turning and spaced at selected intervals along the full length of the chains 30. The top strand 34 of the chain 30 is supported by rail members 36 as may be seen in FIG. 3. Referring again to FIG. 2, a tensioning means 38 is provided to keep the chains 30 under a predetermined amount of tightness.

Referring now to FIG. 1, a transfer assembly 12 is located and mounted near the right or drive end 40 of the infeed conveyor assembly. This transfer assembly 12 comprises a pair of vertical posts 42 mounted to one side of the welded frame 20. A pair of horizontal posts 44 are adjustably carried on vertical posts 42 by way of clamp blocks 46. A transfer actuator 48 is carried on a slide assembly 50. The slide assembly 50 is slidingly engaged on the horizontal posts 44. An adjustment means 52, such as a threaded rod arrangement is provided to locate the transfer actuator 48 at a selected or desired position.

Figure 3:
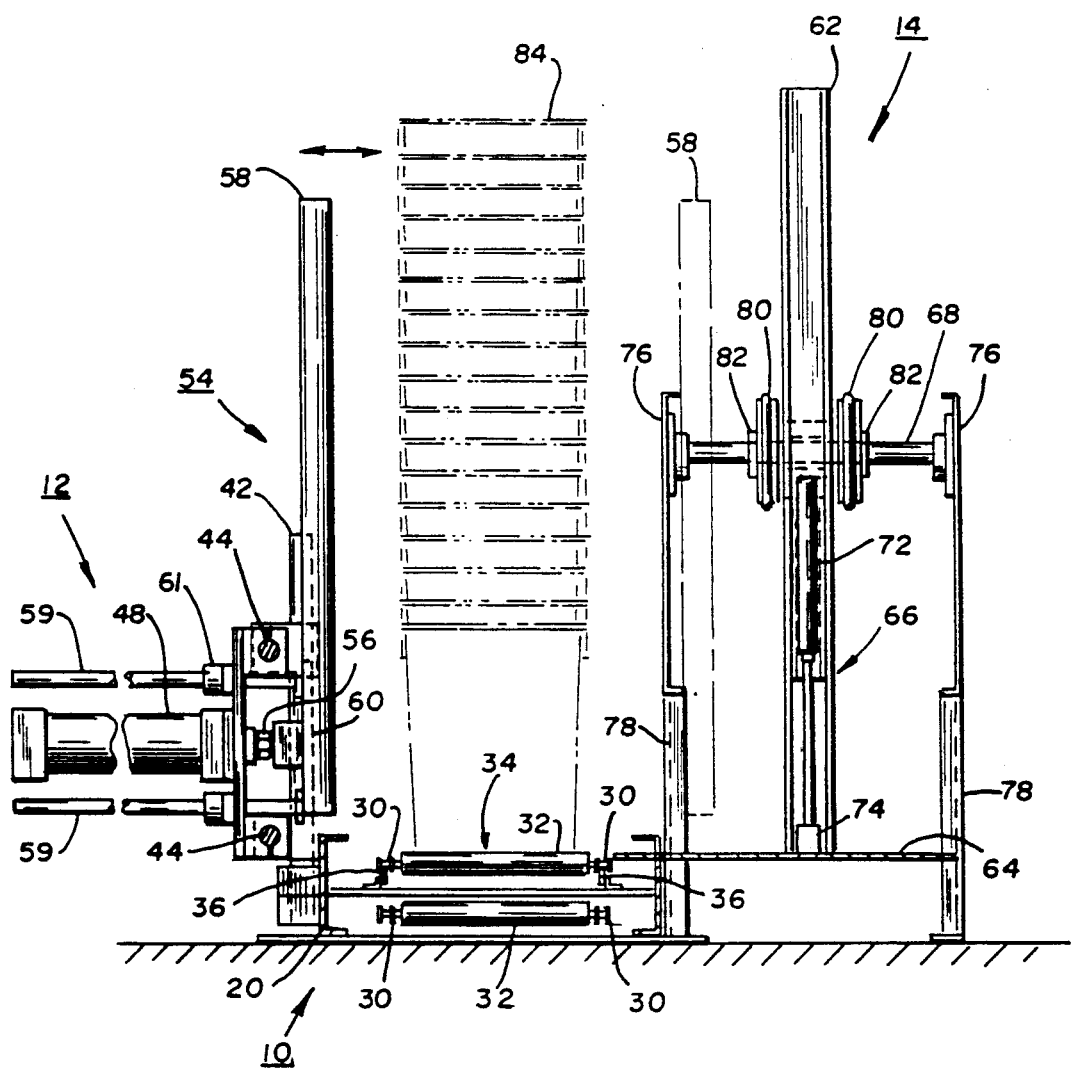
FIG. 3 represents an end view of the apparatus of the present invention, this view taken along line 3—3 of FIG. 1, and in the same scale.

Referring now to FIG. 2 and FIG. 3, a transfer pusher assembly 54 is mounted on a movable shaft 56 of said transfer actuator 48. Preferably the transfer pusher assembly 54 is a pair of vertical rods 58 fastened to a mounting plate 60. Anti-rotation for the transfer pusher assembly is provided by a pair of shafts 59 fastened to the mounting plate 60 and linearly carried in bushings 61.

Referring now to FIG. 2 and FIG. 3. a tilting carriage assembly 14 may be seen. This tilting carriage assembly 14 comprises an elongated channel rail member 62; a support plate 64, fastened to the bottom of the rail member 62; and a stack advancing actuator assembly 66. The elongated rail 62 is pivotally mounted and journaled on a rotating shaft member 68 of the horizontal denesting assembly 16. The tilting carriage assembly 14 is connected to a tilting linear actuator 70 which has its mounting end pivotally attached to the frame of the horizontal conveyor assembly 16, and more clearly seen in FIG. 1. Still referring to FIG. 1, the shaft end of the linear actuator 70 is pivotally attached to the elongated rail 62 at a selected position. Referring now to FIG. 3, the stack advancing actuator 66 comprises a linear actuator 72 such as a pneumatic cylinder having a predetermined stroke. A shoe member 74 is mounted to the end of the piston rod of the linear actuator 72.

The horizontal conveyor assembly 16 preferably is of the type as disclosed in the inventor's U.S. Pat. No. 4,983,098. This horizontal conveyor assembly 16 is partially shown as side plates 76, leg member 78, endless belts 80, and belt pulleys 82. This horizontal conveyor assembly 16 is fully described in the inventor's U.S. patent referenced above.

USE AND OPERATION

The apparatus of the present invention may be considered an on-demand type; that is a vertical stack of nested preformed containers is transferred, tilted, and advanced onto the horizontal conveyor assembly 16 in response to a signal. This signal is sent from a first sensor 88 on the horizontal conveyor assembly 16, as may be seen in FIG. 1.

Referring now to FIG. 1 and FIG. 2, vertical stacks of nested preformed containers 84 are placed on the rollers 32 of the continuously advancing top strand 34 of the infeed conveyor assembly 10. Preferably the vertical stacks 84 are placed at a loading position at or near the left or loading end of the infeed conveyor assembly 10. The vertical stacks 84 are advanced to the right, in the direction of the arrow, toward the drive or transfer end 40 of the infeed conveyor 10. As a first stack 84A passes a second sensor 90, a signal is sent to extend a stop means 92 which stops the advancement of the second stack 84B and any subsequent stacks, more clearly seen in FIG. 2. The rollers 32 of the continuously advancing infeed conveyor 10 will rotate as they contact the bottom of the stopped stack 84B. This rotation of the rollers 32 provides a substantially friction free engagement with the bottom of the stack, thereby eliminating the possibility of accidental and unwanted overturning of the stack 84B.

The advancing stack 84A energizes a third sensor 94, mounted on an adjustable stop 96, causing the transfer assembly 12 to be actuated. Referring now to FIG. 3, the actuation of the transfer assembly 12 will transfer the stack 84A from its position on the rollers 32 of the infeed conveyor assembly 10 onto the support plate 64 of the substantially vertical tilting carriage assembly 14. After completing the transfer of the stack 84A to a desired position on the support plate 64, the transfer actuator 48 of the transfer assembly 12 returns to is start or leftward position. After the transfer actuator 48 returns to its leftward or start position the tilting carriage assembly 14 is rotated counter-clockwise, as seen in FIG. 1, from a substantially vertical disposition to a substantially horizontal disposition by the tilting linear actuator 70. After the tilting carriage 14 fully rotates 90 degrees in the counter clock-wise direction, the shoe member 74 of the stack advancing actuator assembly 66 engages the bottom of the now horizontal stack of nested containers and advances the stack towards the left and onto the endless belts 80 of the horizontal conveyor assembly 16.

After the stack advancing actuator assembly 66 has completed its full leftward stroke, the shoe member 74 is caused to move rightwardly and return to its position in alignment with the support plate 64. With the complete retraction of the shoe member 74 to its more or less start position the tilting carriage assembly 14 is rotated 90 degrees clockwise from its horizontal disposition to its substantially vertical disposition.

The cycle will be repeated as and when the first sensor 88 determines an insufficient quantity of nested containers are present on the horizontal conveyor assembly 16.

It is preferred that interlocks be provided to detect the proper location of the various linear actuators to eliminate the possibility of interference in the motions of the various operating assemblies of this apparatus.

Preferably the infeed conveyor 10 is placed adjacent and parallel to the horizontal conveyor assembly 16, with the loading end near the unloading end of the horizontal conveyor assembly 16. It is believed that this arrangement as shown will provide an efficient use of operating personnel, but it is anticipated that other arrangements may be used to satisfy a particular customers requirements. It is also anticipated that the infeed conveyor may be placed on the side of the horizontal conveyor assembly 16 opposite that shown in FIG. 1.

The transfer pusher assembly 54 is adjustably positioned by an adjustment means 52 to provide a proper alignment of the stack 84A relative to the tilting carriage assembly 14. This adjustment means 52 is used to compensate for various diameter containers which may be placed on the apparatus of the present invention.

Stop means 96 is adjustably mounted to the infeed conveyor frame 20 to provide a desired sensing location for the third sensor 94.

It is to be noted that the logic control circuit for the present invention may be electrically, electronically, or pneumatically controlled. The linear actuators preferably are pneumatic, but hydraulic or electric actuators may be used.

Terms such as "left", "right", "up", "down", "bottom", "top", "front", "back", "in", "out", and the like are applicable to the embodiments shown and described in conjunction with the drawings. These terms are merely for the purpose of description and do not necessarily apply to the position in which the apparatus of the present invention may be utilized.

While these particular embodiments of an improved apparatus has been shown and described, it is to be understood that the invention is not limited thereto and protection is sought to the broadest extent the prior art allows.

What is claimed is:

1. An automatically operated feeding and tilting apparatus for reorienting a stack of nested preformed containers, said apparatus comprising:
   (a) An infeed conveyor assembly having a loading end and a transferring end, said infeed conveyor assembly including;
      a1) a frame assembly adapted for horizontal disposition substantially at floor level,
      a2) a plurality of selectively spaced rollers, said rollers rotationally carried by and between a pair of spaced substantially continuous chain members, said pair of chain members with said rollers carried there-between adapted for selective continuous advancement interior of said frame assembly, said continuous advancement for carrying a vertically oriented stack of nested preformed containers from a loading position to said transferring end, a3) a drive means for providing said continuous advancement of said spaced rollers;

(b) a tilting carriage assembly including;

b1) an elongated rail member adapted to slidingly support said nested stack of preformed containers carried thereon as and when said rail member is brought to a substantially horizontal disposition, said elongated rail member further adapted for pivotal mounting on a horizontal denesting assembly, b2) a support plate fastened to one end of said elongated rail member, said support plate arrayed for a substantially flush alignment of its major surface with a top surface of said plurality of rollers at said transferring end of said infeed conveyor assembly when and as said elongated rail member is brought to a substantially vertical array, b3) a stack advancing assembly adapted for selectively and linearly advancing said stack of nested preformed containers from said rail member onto said horizontal denesting assembly, said stack advancing assembly being selectively responsive to the rotation of the rail member to a substantially horizontal array, said rotation being about said pivotal mounting;

(c) an actuating means for selectively rotating said tilting carriage assembly between said substantially vertical array and said substantially horizontal array, (d) A transfer means assembly selectively mounted at said transferring end of said infeed conveyor, said transfer means assembly adapted for selectively transferring a single stack of vertically oriented nested preformed containers from said infeed conveyor assembly onto said support plate of said tilting carriage assembly when and as said tilting carriage assembly is in said substantially vertical array; and (e) a stop means selectively positioned between said loading position and said transferring end, said stop means selectively actuated for allowing only one vertically oriented stack of nested preformed containers in way of said transfer means assembly, said rotationally carried rollers providing for the substantially friction-free movement of the continuously advancing rollers against bottoms of any stacks of vertically nested containers being selectively stopped from advancing.

2. An apparatus as recited in claim 1 wherein said transfer means assembly includes:

(a) a pair of selectively spaced vertical post members mounted to and extending from said frame assembly;

(b) A pair of selectively spaced horizontal post members carried on said pair of vertical posts, said pair of horizontal posts having an adjustment means for locating and holding said pair of horizontal posts at a selected position;

(c) a transfer actuator adjustably carried on said pair of horizontal posts;

(d) a transfer pusher assembly mounted on an end of an actuating rod of said transfer actuator for guiding said nested stack of preformed containers from said transferring end onto said tilting carriage assembly;

(e) an anti-rotation means for maintaining said transfer pusher assembly at a selected orientation; and (f) an adjustment means for selectively positioning and maintaining said transfer actuator with said transfer pusher assembly mounted thereon in a selected alignment with said tilting carriage assembly.

3. An apparatus as recited in claim 2 wherein said transfer means assembly includes a sensor means for detecting the presence of a vertically oriented stack of nested preformed containers at said transferring end.

4. An apparatus as recited in claim 2 wherein said stop means includes:

(a) a second sensor for detecting the presence of a first of a row of vertically oriented stacks of nested preformed containers; and (b) a linear actuator for stopping a second and subsequent vertically oriented stacks of nested preformed containers carried on said infeed conveyor assembly until said first stack is removed from said transferring end.

5. An apparatus as recited in claim 2 wherein said elongated rail member is channel shaped with each end of its leg members for providing sliding support and guidance for said stack of nested preformed containers thereon.

6. An apparatus as recited in claim 5 wherein said stack advancing means includes a linear actuator having a selected operating stroke, said linear actuator adapted for mounting interior of said channel shaped rail member without interfering with said stack of nested preformed containers.

7. An apparatus as recited in claim 2 wherein said substantially continuous advancement of said infeed conveyor assembly and said linearly advancing of said stack by said transfer means are in substantially parallel alignment and said transferring of a single stack by said transfer means is at substantially ninety degrees to said parallel alignment.

8. An apparatus as recited in claim 7 wherein said continuous advancement of said vertically oriented stacks and said linear advancement of said horizontally oriented stacks are in opposite directions.

9. An apparatus as recited in claim 1 wherein said stop means includes;

(a) a second sensor for detecting the presence of a first of a row of vertically oriented stacks of nested preformed containers; and (b) a linear actuator for stopping a second and subsequent vertically oriented stacks of nested preformed containers carried on said infeed conveyor assembly until said first stack is removed from said transferring end.

10. An apparatus as recited in claim 1 wherein said elongated rail member is channel shaped with each end of its leg members for providing sliding support and guidance for said stack of nested preformed containers thereon.

11. An apparatus as recited in claim 10 wherein said stack advancing means includes a linear actuator having a selected operating stroke, said linear actuator adapted for mounting interior of said channel shaped rail member without interfering with said stack of nested preformed containers.

12. An apparatus as recited in claim 1 wherein said substantially continuous advancement of said infeed conveyor assembly and said linearly advancing of said stack by said transfer means are in substantially parallel alignment and said transferring of a single stack by said transfer means is at substantially ninety degrees to said parallel alignment.

13. An apparatus as recited in claim 12 wherein said continuous advancement of said vertically oriented stacks and said linear advancement of said horizontally oriented stacks are in opposite directions.

* * * * *